United States Patent [19]

Palmer

[11] 4,351,723
[45] Sep. 28, 1982

[54] MEANS FOR REMOVING RESIDUAL WATER FROM A SURFACE

[76] Inventor: Michael C. Palmer, 8938 - 179 Pl., SW., Edmonds, Wash. 98020

[21] Appl. No.: 179,233

[22] Filed: Aug. 18, 1980

Related U.S. Application Data

[63] Continuation of Ser. No. 40,859, May 21, 1979, abandoned.

[51] Int. Cl.³ .............................................. B01D 35/02
[52] U.S. Cl. .................................. 210/198.1; 15/353; 210/241; 210/258; 210/416.1
[58] Field of Search ............. 210/241, 416 R, 416 AS, 210/198.1, 258, 416.1; 15/331, 342, 353

[56] References Cited

U.S. PATENT DOCUMENTS

| | | | |
|---|---|---|---|
| 1,461,173 | 7/1923 | Bennett | 15/353 |
| 2,534,808 | 12/1950 | Bevington, Jr. et al. | 15/353 |
| 2,657,416 | 11/1953 | Smith | 15/353 X |
| 2,771,998 | 11/1956 | Holden | 210/198.1 |
| 3,006,020 | 10/1961 | Fillery | 15/353 |
| 3,180,071 | 4/1965 | Nolte | 15/353 R |
| 3,431,582 | 3/1969 | Grace | 15/353 |
| 3,562,846 | 2/1971 | Creemer et al. | 15/353 |
| 4,041,569 | 8/1977 | Petersen | 15/353 |
| 4,133,072 | 1/1979 | Face, Jr. | 15/353 |
| 4,142,270 | 3/1979 | Nauth | 15/353 |

Primary Examiner—Peter A. Hruskoci
Attorney, Agent, or Firm—Cole, Jensen & Puntigam

[57] ABSTRACT

A portable self-contained apparatus for removing essentially all residual water from a surface including a primary source of energy driving an air pump. A reservoir and a filter mounted therein are located adjacent the air pump. Water is collected in the reservoir via a vacuum forced conduit where it is aerated and passed through the vacuum pump to be discharged at a point some distance from the location of the apparatus.

1 Claim, 4 Drawing Figures

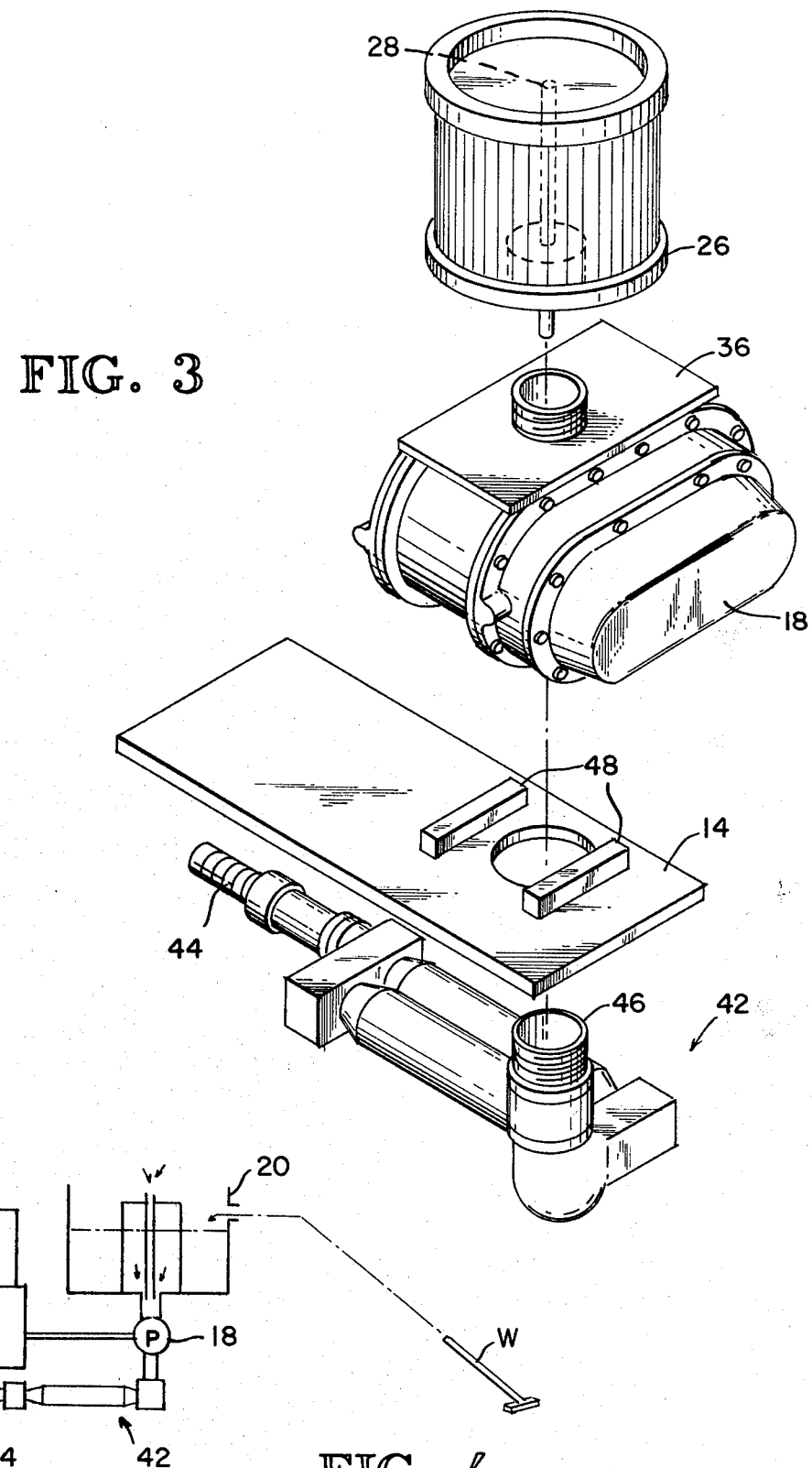

MEANS FOR REMOVING RESIDUAL WATER FROM A SURFACE

This is a continuation of application Ser. No. 040,859, filed May 21, 1979, now abandoned.

BACKGROUND OF THE INVENTION

There are a great number of occurrences wherein liquid and particularly water accumulates upon a surface and must be removed for one reason or another. It is obvious that if the liquid is to be removed, the sooner this can be accomplished, the more beneficial. There are a large number of pumps on the market which in combination with auxilliary equipment will efficiently remove the majority of the liquid leaving a thin layer or residue which cannot be accommodated and must be removed by other methods. The reason the pumps presently on the market cannot remove all of the liquid is that they are in general water pumps and, as such, need to have the entry or suction nozzle completely immersed in water in order to function. Following the removal of the majority of the liquid by the equipment mentioned hereinabove, then there are available back pack type units having more precise and thus lower volume capacity nozzles which can be used on an intermittent basis to remove the majority of the remainder of the water. One problem with the back pack unit is that they store the removed liquid in a carried cannister and thus have a limited capacity. A great deal of time and manpower is required to remove this remaining water.

The present invention utilizes a novel concept in water removal and as a result, can be used much more efficiently to remove the residual water following the gross or bulk removal. A prime mover, usually a gasoline driven engine, is mounted upon a hand manipulated wheeled framework and is used to drive an air pump also mounted upon the framework. A reservoir and combination filter, and aeration mechanism is mounted adjacent to and preferably on top of the air pump which has its inlet connected to the reservoir and within the filter body. The reservoir is closed and a vacuum cleaner type conduit is attached to a port in the upper portion of the reservoir. With the engine running, an operator with a wand, preferably with a squeegee type tool on the end sweeps the floor and the remaining water and debris is sucked through the hose into the reservoir. The water is then aerated by means of a tube mounted interiorly of the reservoir but extending upwardly above the normal liquid level and is sucked down, passing through the air pump and out the discharge for the air pump. Obviously, the discharge may have a hose attached for transporting liquid to a distant point such that it is removed from the premises.

A novelty search has not been performed.

With the above noted prior art and problems in mind, it is an object of the present invention to provide a mechanism whereby water may be quickly and efficiently removed from a surface.

It is another object of the present invention to provide a mechanism whereby a mixture of air and water can be efficiently passed through an air pump to be discharged at a distant point.

It is still a further object of the present invention to provide a mechanism at the input of an air pump to mix air with liquid to enable the passage of the liquid through the air pump without overloading the pump.

Yet another object of the present invention is to provide a portable apparatus for removing all of the liquid from a flat undrained surface.

BRIEF DESCRIPTION OF THE DRAWINGS

FIG. 3 is an exploded view of the main elements of the present invention.

FIG. 4 is a schematic representation of the present invention.

DETAILED DESCRIPTION OF THE DRAWINGS

Figure 1:
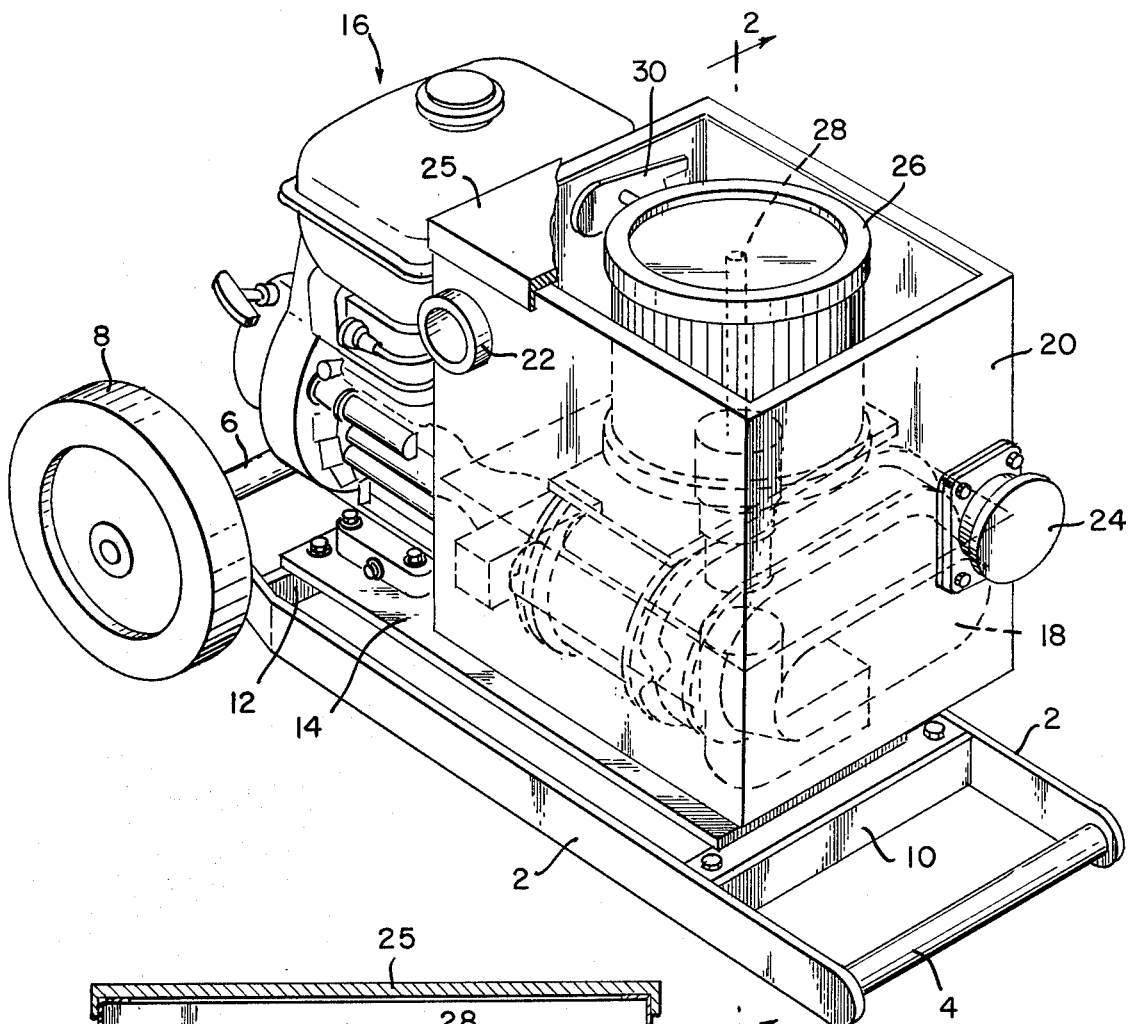
FIG. 1 is an isometric view of a preferred embodiment of the inventive fluid removal system.

As seen in FIG. 1, the present invention includes a basic framework having side rails 2 interconnected by means of a handle 4 at one end and an axle 6 at the other end thereof. A pair of wheels 8 are mounted upon opposite ends of the axle 6, and a pair of linking frame elements 10 and 12 extend between the side rails 2 and support plate 14 thus providing rigidity and a platform for the working portion of the device.

Mounted upon support plate 14 is a gasoline engine 16, an air pump 18 and the recovery tank 20. Also seen in this view, is an inlet 22 to the recovery tank, to which a vacuum type hose is attached. The hose or conduit must be of a length to conveniently extend to where the fluid is to be removed. Also seen in this view is a dump opening 24 for removing any fluid or other material that remains within the recovery tank following the completion of the cleanup.

The cover 25 for the recovery tank 20 has been partially removed in this figure so that the interior arrangement including a filter 26, an aeration tube 28 and the vacuum relief valve 30 may be seen. As will be explained in greater detail hereinafter, the liquid is sucked into the recovery tank via the opening 22 and its attached conduit, forms a pool within the reservoir and is drawn down through the filter by means of the vacuum pump 18 mounted therebelow. At the time the water is drawn in through the filter, air is likewise introduced and since the aeration tube 28 extends upwardly beyond the level of liquid within the reservoir, additional air is continuously drawn into the air pump 18 where, when combined with the fluid, allows the mixture to pass therethrough while preventing an overload within the pump. As will be recognized, the air pump is designed to pump a compressible fluid and not a solid fluid and the aeration is necessary. A vacuum relief valve 30 is provided such that in the event that there is not sufficient air within the recovery tank during operation. The valve will open and admit additional air for aeration. A high vacuum situation could occur if the level of water on the surface i.e. that to be removed is high enough that the operator has the end of his wand beneath the surface and completely fills the vacuum hose and the cover is tightly sealed against the top of the recovery tank, thus subjecting the interior of the reservoir to a constant negative pressure without relief. If this situation occurs, or any other situation which results in a lack of air within the reservoir recovery tank, after the negative pressure reaches a predetermined limit, the relief valve will automatically open allowing more air to fill the tank so that the pump may continue to function with the appropriate mixture.

Figure 2:
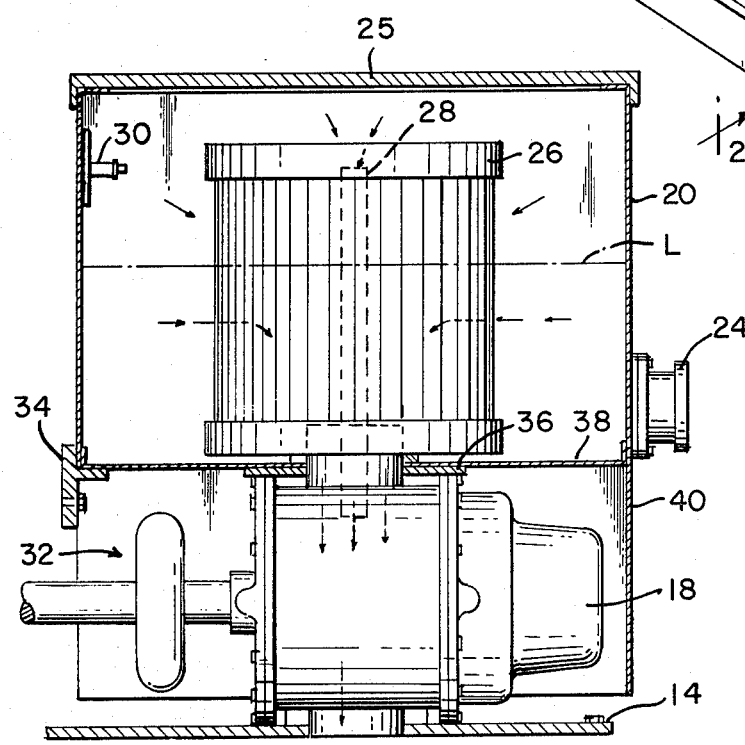
FIG. 2 is a sectional view taken along lines 2—2 of FIG. 1.

Referring now to FIG. 2, it can be seen that the vacuum pump 18 is mounted upon plate 14 and is coupled to the gasoline engine 16 (not shown in this view) by means of a flexible coupling 32. The relative location of the aeration tube 28, the filter 26 and the recovery tank is also to be seen in this view. It is to be noted that the recovery tank 20 is secured in position on top of the air pump and that it rests upon bracket member 34 which is bolted to the engine 16. The recovery tank 20 is secured against a plate 36 mounted upon the top of the air motor since the filter 26 is treadingly engaged with the inlet of the air pump and thus locks the bottom 38 of the recovery tank 20 in position. Skirts 40 extend downwardly from the bottom of the recovery tank 20 to enclose the air pump and essentially enclose the driving connection between the air pump and the gasoline engine thus providing a safety shield as well as improving the appearance.

Referring now to FIG. 3, it can be seen that the silencer, generally designated as 42, has an outlet element 44 to which a hose may be attached and thus allowing the fluid now aerated and having passed through the pump 18 may be discharged under pressure.

The silencer 42 has an upwardly extending threaded portion 46 which extends through plate 36 having mounting blocks 48 thereon to support the air pump 18. The air pump 18 is threadingly engaged with the upwardly extending portion 46 and has at its opposite side a plate 36 through which an upwardly extending element passes to threadingly engage the filter 26 which includes, as noted above, aeration tube 28.

Referring now in particular to FIG. 4, it can be seen that the engine 16 drives the air pump 18 which causes fluid to be drawn into the recovery tank 20 to level L by means of a vacuum hose and a wand W. The fluid is aerated within the recovery tank 20, passes through the pump 18 and then is discharged through the silencer exhaust system 42, 44.

Thus, as can be seen, the present invention provides an efficient economical portable unit for use in withdrawing water from a surface whether accumulated there by fire fighting, a faulty sprinkler system, overflowing plumbing or any other means. The mechanism essentially removes all residual water from a flat undrained surface allowing much more rapid reuse.

What is claimed is:

1. An apparatus for removing liquid from a substantially flat surface such as a floor, comprising:
    framework means;
    substantially closed reservoir means mounted on said framework means for holding a liquid, such as water, said reservoir means having an inlet port near the top thereof which is adapted to receive a hose which, in operation, is extended to the liquid to be removed, and an outlet port near the bottom thereof, the inlet port being located above the typical level of liquid in said liquid reservoir when the apparatus is in operation, and the outlet port being located below the typical level of liquid in said liquid reservoir when the apparatus is in operation, said apparatus means being characterized by an absence of means to prevent liquid in said reservoir means from flowing through the outlet port thereof;
    pump means for pumping compressible fluid, such as air mounted on the framework means, said pump means having an inlet and an outlet, and an internal configuration between the inlet and outlet such that a liquid, such as water, which is drawn into said pump means through the inlet thereof will flow through the pump means and exit through the outlet thereof;
    means connecting the outlet port of said liquid reservoir means to the inlet of said pump means;
    filter means positioned upstream of the pump means for filtering liquid from said reservoir means prior to the liquid reaching the pump means; and
    aeration means including a conduit having a first open end within the throat of the pump and extending to a position whereat the second open end is continuously in communication with the ambient atmosphere.

* * * * *